(12) United States Patent
Yang et al.

(10) Patent No.: US 9,179,342 B2
(45) Date of Patent: Nov. 3, 2015

(54) FCCH BURST DETECTION ABORT METHOD FOR INTER-RADIO ACCESS TECHNOLOGY (IRAT) MEASUREMENT

(71) Applicant: QUALCOMM Incorporated, San Diego, CA (US)

(72) Inventors: Ming Yang, San Diego, CA (US); Tom Chin, San Diego, CA (US); Qingxin Chen, Del Mar, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 131 days.

(21) Appl. No.: 13/970,385

(22) Filed: Aug. 19, 2013

(65) Prior Publication Data
US 2015/0049617 A1 Feb. 19, 2015

(51) Int. Cl.
*H04L 1/00* (2006.01)
*H04W 24/08* (2009.01)
*H04W 24/10* (2009.01)
*H04W 36/00* (2009.01)
(Continued)

(52) U.S. Cl.
CPC .............. *H04W 24/08* (2013.01); *H04W 24/10* (2013.01); *H04W 36/0088* (2013.01); *H04W 48/06* (2013.01); *H04W 88/06* (2013.01)

(58) Field of Classification Search
CPC ..... H04W 24/00; H04W 24/08; H04W 24/06; H04W 16/18; H04W 80/04; H04W 36/18; H04W 36/0011; H04W 36/14; H04W 36/08; H04L 12/2697; H04L 43/50; H04L 43/08; H04B 17/003

USPC ......... 370/229, 230, 235, 252, 253, 329–331; 455/423–444
See application file for complete search history.

(56) References Cited

U.S. PATENT DOCUMENTS

| 7,649,869 | B2 | 1/2010 | Mittal et al. |
| 7,865,156 | B2 | 1/2011 | Simmons et al. |
| 2004/0002334 | A1 | 1/2004 | Lee et al. |

(Continued)

FOREIGN PATENT DOCUMENTS

| WO | 2004039017 A1 | 5/2004 |
| WO | 2011090496 A1 | 7/2011 |
| WO | 2013055338 A1 | 4/2013 |

OTHER PUBLICATIONS

International Search Report and Written Opinion—PCT/US2014/047680—ISA/EPO—Oct. 28, 2014.

(Continued)

*Primary Examiner* — Dady Chery
(74) *Attorney, Agent, or Firm* — Seyfarth Shaw LLP

(57) ABSTRACT

A system acquisition is initiated to perform inter radio access technology (IRAT) measurement. A waiting period of time is provided before aborting the system acquisition. The period of time is adjustable based on at least one metric. The metric can be a frequency of available measurement gaps, a total number of available measurement gaps, and/or a length of each measurement gap within a subframe. The metric could also be an absolute signal strength of a single neighbor cell and/or a relative signal strength between neighbor cells. The metric could also be a user equipment (UE) measured signal strength compared to a network indicated threshold value for triggering an IRAT measurement report. The metric could also be a percentage of a tone that falls within a measurement gap.

16 Claims, 7 Drawing Sheets

(51) Int. Cl.
*H04W 48/06* (2009.01)
*H04W 88/06* (2009.01)

(56) References Cited

U.S. PATENT DOCUMENTS

| | | |
|---|---|---|
| 2010/0035610 A1 | 2/2010 | Narang et al. |
| 2011/0207453 A1* | 8/2011 | Hsu et al. ............... 455/424 |
| 2012/0064897 A1* | 3/2012 | Amirijoo et al. ......... 455/436 |
| 2012/0314589 A1 | 12/2012 | Chen et al. |
| 2013/0142058 A1 | 6/2013 | Chin et al. |
| 2013/0189988 A1* | 7/2013 | Alonso-Rubio et al. ...... 455/436 |
| 2013/0344872 A1* | 12/2013 | Nukala et al. ............. 455/437 |

OTHER PUBLICATIONS

Samsung: "Correction to the reference in section 14.9.2", 3GPP DRAFT; 25331_CRXXXX_(Rel-9)_R2-097050 Editorial, 3rd Generation Partnership Project (3GPP), Mobile Competence Centre; 650, Route Des Lucioles; F-06921 Sophia-Antipolis Cedex; France, no. Jeju; Nov. 9, 2009, XP050390835, 8 Pages, [retrieved on Nov. 2, 2009] p. 4, paragraph 10.3.6.33.

* cited by examiner

FCCH BURST DETECTION ABORT METHOD FOR INTER-RADIO ACCESS TECHNOLOGY (IRAT) MEASUREMENT

BACKGROUND

1. Field

Aspects of the present disclosure relate generally to wireless communication systems, and more particularly, to a frequency correction channel (FCCH) burst detection abort method for inter radio access technology (IRAT) measurement.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes initiating a system acquisition to perform inter radio access technology (IRAT) measurement. The method also includes waiting a period of time before aborting the system acquisition. The period of time is adjustable based, at least in part on, a metric(s).

Another aspect discloses an apparatus including means for initiating a system acquisition to perform inter radio access technology (IRAT) measurement. The apparatus also includes means for waiting a period of time before aborting the system acquisition. The period of time is adjustable based, at least in part on, a metric(s).

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of initiating a system acquisition to perform inter radio access technology (IRAT) measurement. The program code also causes the processor(s) to wait a period of time before aborting the system acquisition. The period of time is adjustable, based at least in part on, at least one metric.

Another aspect discloses wireless communication having a memory and at least one processor coupled to the memory. The processor(s) is configured to initiate a system acquisition to perform inter radio access technology (IRAT) measurement. The processor(s) is also configured to wait a period of time before aborting the system acquisition. The period of time may be adjusted based, at least in part on, a metric(s).

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
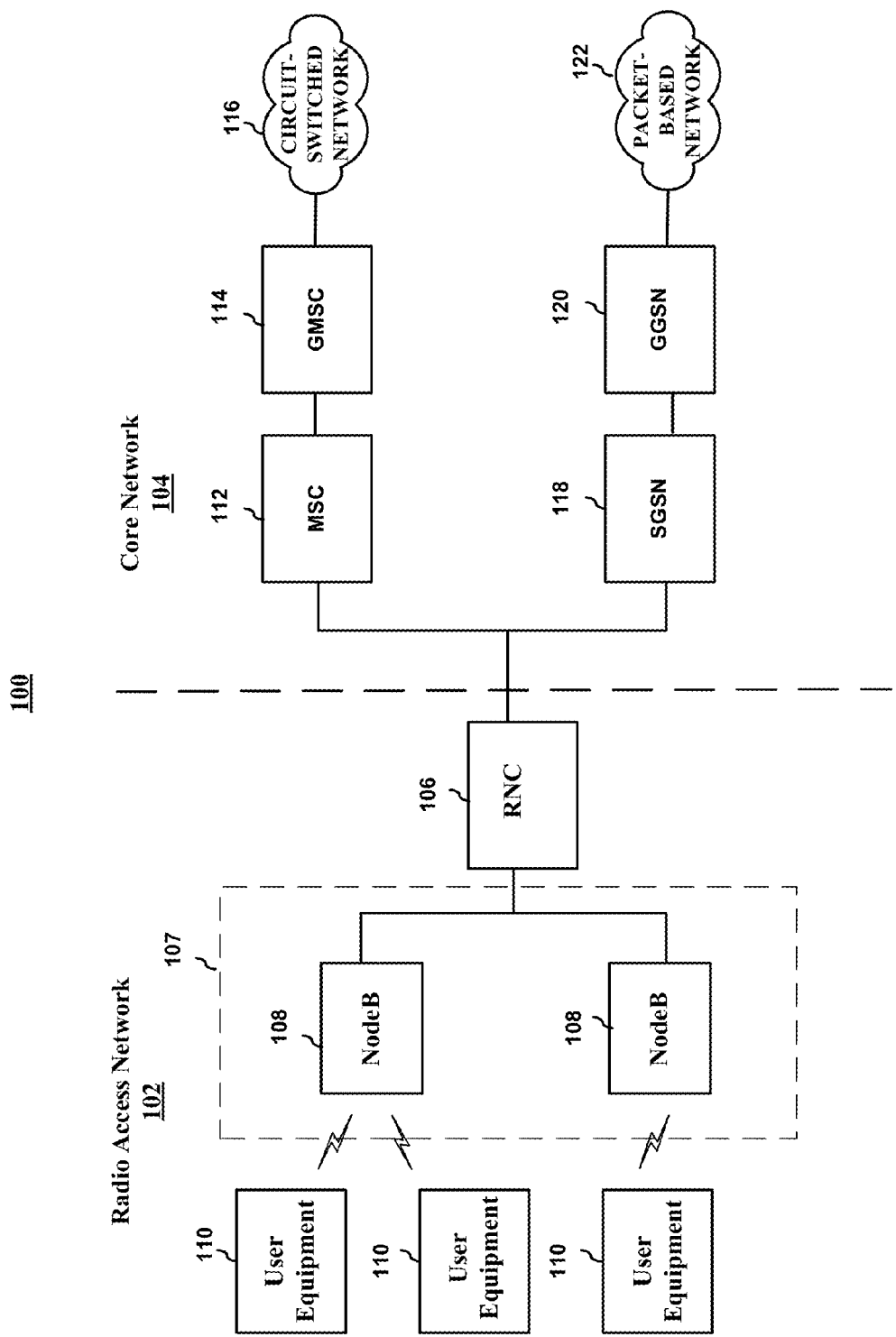
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
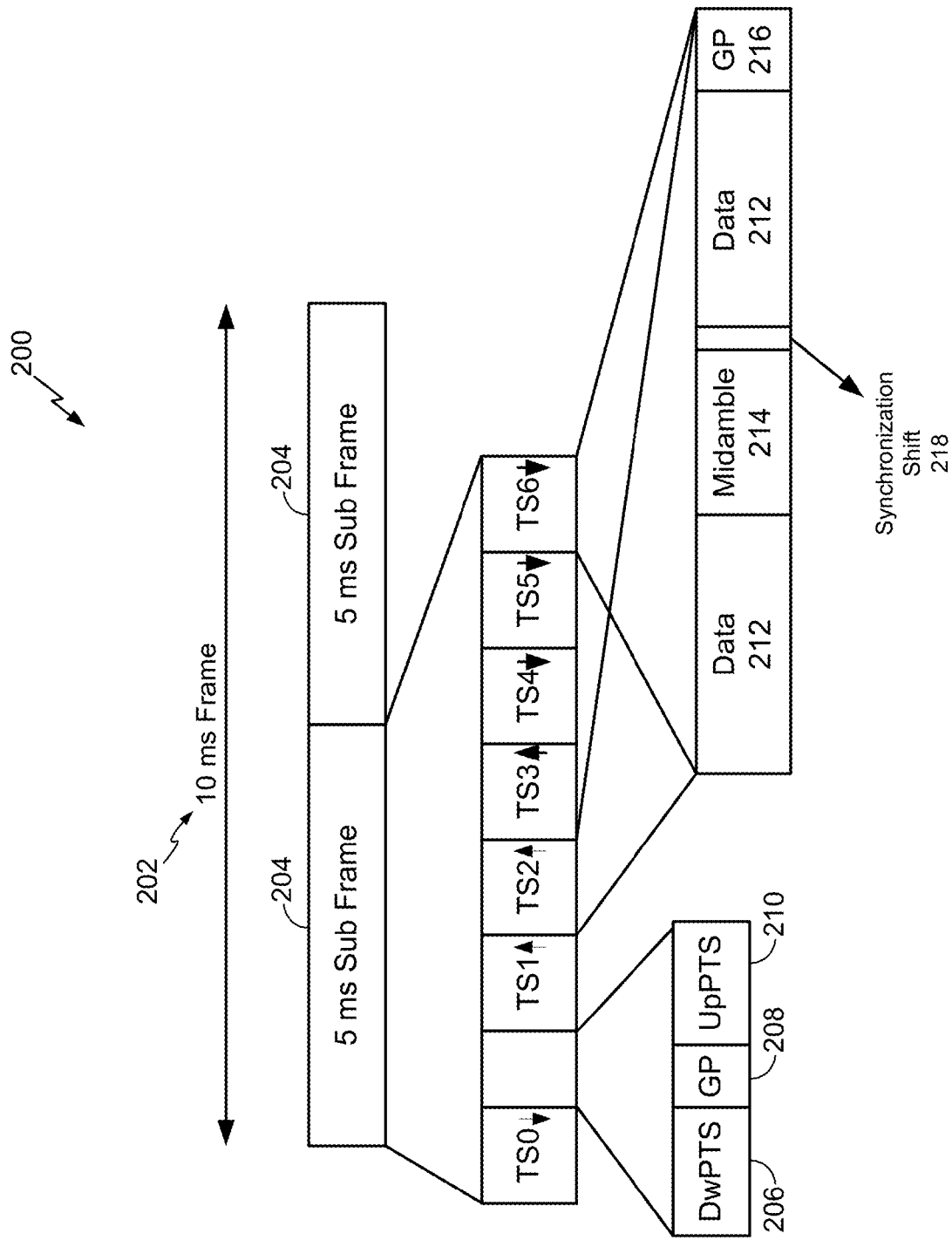
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
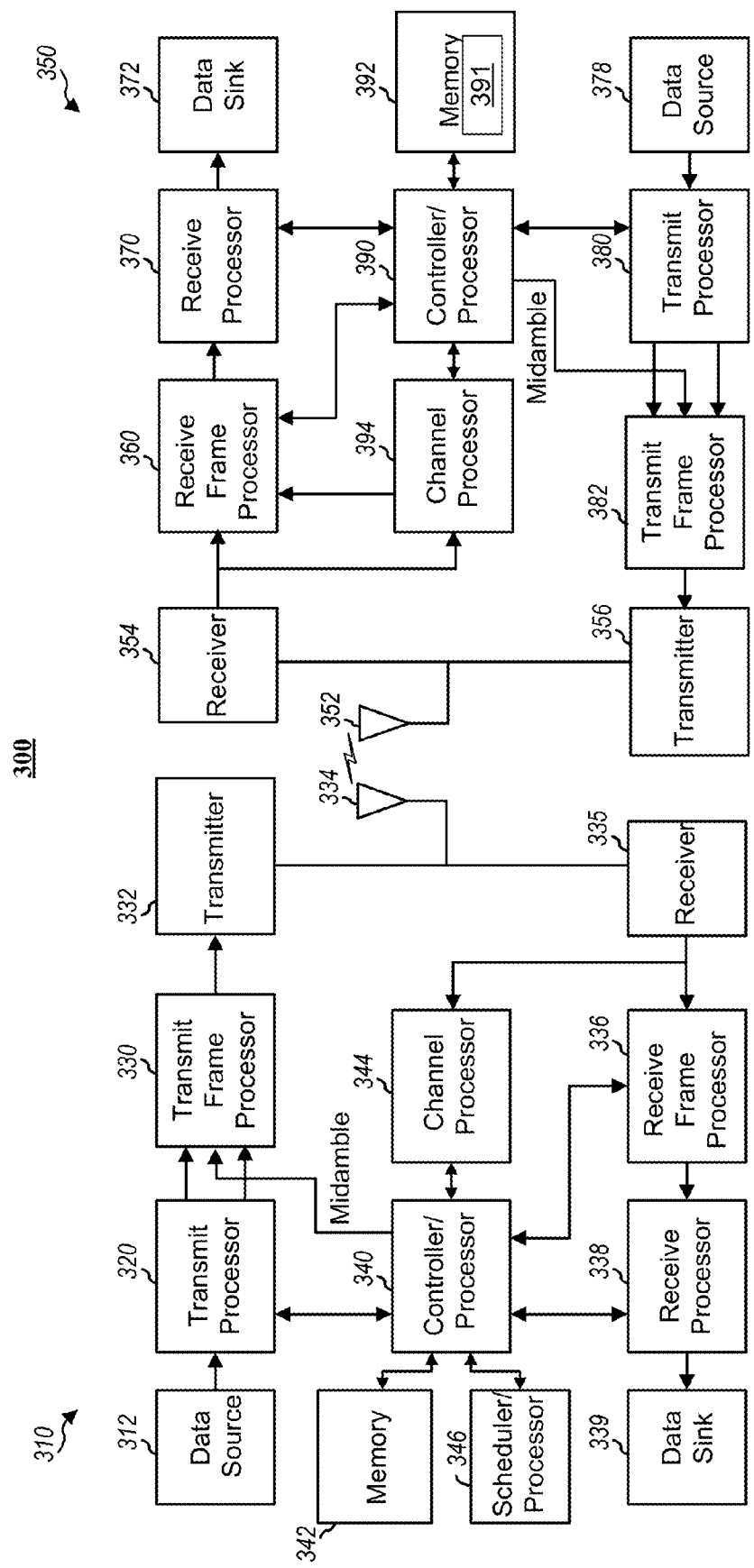
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded.

The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store abort timer module 391 which, when executed by the controller/processor 390, configures the UE 350 to wait an adjustable period of time before aborting a system acquisition. A scheduler/processor 346 at the node B 310 may be used to allocate resources to the UEs and schedule downlink and/or uplink transmissions for the UEs.

Figure 4:
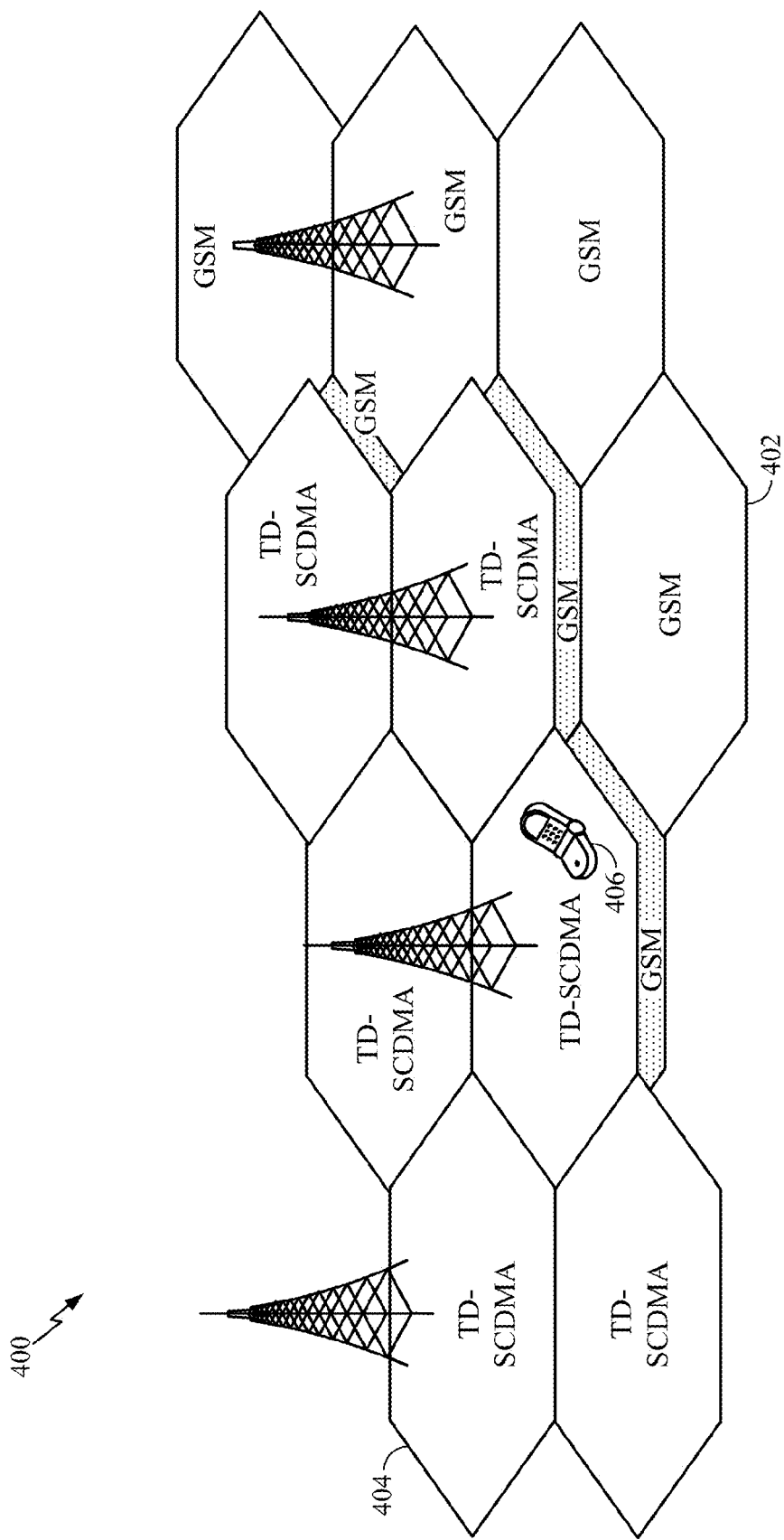
FIG. 4 illustrates network coverage areas according to aspects of the present disclosure.

FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Other radio access technologies, such as a wireless local area network (WLAN) or WiFi may also be accessed by a user equipment (UE) in addition to cellular networks such as TD-SCDMA or GSM. For the UE to determine nearby WiFi access points (APs), the UE scans available WiFi channels to identify/detect if any WiFi networks exist in the vicinity of the UE. In one configuration, the UE may use TD-SCDMA reception/transmission gaps to switch to the WiFi network to scan the WiFi channels.

FCCH Burst Detection Abort Method for IRAT Measurement

Handover from a first radio access technology (RAT) to a second RAT may occur for several reasons. First, the network may prefer to have the user equipment (UE) primarily use the first RAT but use the second RAT simply for voice service(s). Second, there may be coverage holes in the network of one RAT, such as the first RAT.

Handover from the first RAT to the second RAT may be typically based on event 3A measurement reporting. In one configuration, event 3A measurement reporting may be triggered based on four filtered measurements of the first RAT and/or the second RAT. The first measurement may be a Primary Common Control Physical Channel (P-CCPCH) or a Primary Common Control Physical Shared Channel (P-CCPSCH) received signal code power (RSCP) measurement of a serving cell. The second measurement may be a received signal strength indication (RSSI) of a cell of the second RAT. The third measurement may be the base station identity code (BSIC) confirm signal or procedure of the second RAT. The fourth measurement may be the BSIC re-confirm signal or procedure of the second RAT.

The initial BSIC identification procedure includes searching for the BSIC and decoding the BSIC for the first time because there is no knowledge about the relative timing between a cell of the first RAT and a cell of the second RAT. The UE may trigger the initial BSIC identification within the available idle time slots when the UE is still in a dedicated channel (DCH) mode configured for the first RAT.

The BSIC of a cell in the second RAT is considered to be "verified" when the UE has decoded the synchronization channel (SCH) of the broadcast control channel (BCCH) carrier and identified the BSIC at least one time with an initial BSIC identification. The initial BSIC identification is typically performed within a predefined time period (for example, $T_{identify\_abort}$=5 seconds) and when the BSIC has been reconfirmed at least once every $T_{re-confirm\_abort}$ seconds (e.g., $T_{re-confirm\_abort}$=5 seconds). Otherwise, the BSIC of a cell in the second RAT is considered to be "non-verified."

The initial BSIC identification procedure may take a longer amount of time to perform (e.g., up to 5 seconds or more) because there is no knowledge about the relative timing between the serving cell of the first RAT and the neighbor cells of the second RAT. This BSIC identification procedure includes blind frequency correction channel (FCCH) burst detection based on a fixed bit sequence carried on the FCCH to find the relative timing between the first RAT and the second RAT. The procedure may be considered fully blind due to not knowing about the relative timing between the first RAT and the second RAT. The FCCH burst detection may also be based on two equations, the shared channel (SCH) is first, (11+n·10) frames or second, (12+n·10) frames of the second RAT later than the FCCH. The dot operator represents multiplication and n can be any positive number. These equations are used to schedule idle time slots to decode the SCH if the SCH falls into a measurement gap.

Figure 5:
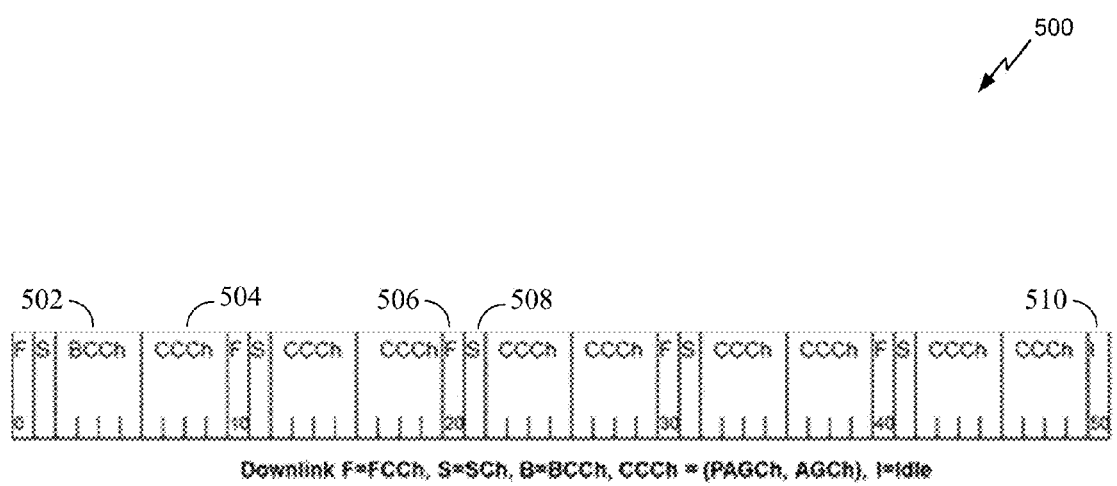
FIG. 5 is a block diagram illustrating the timing of channel carriers according to aspects of the present disclosure.

FIG. 5 is a block diagram 500 illustrating the timing of channel carriers according to aspects of the present disclosure. The block diagram 500 shows a BCCH carrier 502, a common control channel (CCCH) carrier 504, a FCCH carrier 506, a SCH carrier 508 and an idle time slot 510. The numbers at the bottom of the block diagram 500 indicate various moments in time. In one configuration, the numbers at the bottom of the block diagram 500 are in seconds. In one configuration, each block of a FCCH carrier 506 may include eight time slots, with only the first timeslot (or TS0) being used for FCCH burst detection.

The timing of channel carriers shown in the block diagram 500 may occur in a BSIC identification procedure. For example, the BSIC of a cell in a RAT is considered to be "verified" when the UE has decoded the SCH carrier 508 of the BCCH carrier 502 and identified the BSIC at least one time with an initial BSIC identification. The BSIC identification procedure may also include detection of the FCCH carrier 506, or FCCH bursts, based on a fixed bit sequence that is carried on the FCCH carrier 506. FCCH burst detection is performed to find the relative timing between multiple RATs. The FCCH burst detection may be based on how the SCH carrier 508 is either a first number of frames or a second number of frames later in time than the FCCH carrier 506. In one configuration, the first number of frames is equal to 11+n·10 frames, where the dot operator signifies multiplication and n can be any positive number. In one configuration, the second number of frames is equal to 12+n·10 frames, where the dot operator signifies multiplication and n can be any positive number. The first number of frames and the second number of frames may be used to schedule idle time slots in order to decode the SCH carrier 508, in case the SCH carrier 508 falls into a measurement gap or an idle time slot 510.

For FCCH burst detection in an inter RAT measurement, the FCCH may fully or partially fall within the idle time slots of the first RAT (not shown). The UE attempts to detect FCCH bursts (for example, such as the FCCH carrier 506) on the BCCH carrier (for example, the BCCH carrier 502) of the n strongest BCCH carriers of the cells in the second RAT indicated by the measurement control information. In one configuration, n is eight. The UE gives priority to the FCCH burst detection attempts based on decreasing RSSI signal strength order of the second RAT. The strongest BCCH carrier is defined as the BCCH carrier having the highest measured second RAT carrier RSSI value after layer 3 (or network layer) filtering. The signal strength levels used in BSIC identification for arranging cells of the second RAT in decreasing signal strength order may be based on the latest carrier RSSI measurements results available for the second RAT.

When the FCCH burst of a BCCH carrier of the second RAT is successfully detected, the UE immediately continues with the next BCCH carrier, in decreasing signal strength order. Then, an unknown FCCH burst sometime in the future will become the next detected FCCH burst.

In one configuration, if the UE has not successfully detected the FCCH burst of the BCCH carrier of the second RAT within a fixed time (e.g., equal to 1.5 seconds), then the UE aborts the FCCH burst detection attempts for that particular BCCH carrier of the second RAT. The UE may then continue to perform FCCH burst detection attempts for the next BCCH carrier from the second RAT in signal strength order. The BCCH carrier of the second RAT for which the FCCH burst detection attempts failed may be reconsidered after the FCCH burst detection attempts for the rest of the n strongest BCCH carriers of the second RAT. In one configuration, n is 8.

When the UE fails to detect the tone of the first strongest neighbor cell of the second RAT after a fixed duration of time, then the second and third ordered neighbor cells of the second RAT get chances for tone detection attempts. That is, tone detection is performed on a first frequency or first cell for a fixed amount of time before moving on to perform tone detection for the second frequency or second cell, the third frequency or third cell and so on. This may significantly delay the IRAT measurement procedure, which may result in an IRAT handover failure. IRAT handover failure especially occurs when the strongest absolute radio frequency channel number (ARFCN) of the second RAT is subject to strong interference.

According to one aspect of the present disclosure, an adjustable FCCH burst detection abort timer is provided. The time of the abort timer is adjusted based on metrics such as the frequency of available measurement gaps, for example, how often usable measurement gaps occur within a radio frame. Other metrics include the total number of measurement gaps or the length of each measurement gap within a subframe, for example. These metrics represent potential measurement opportunities for the measurement gaps. Thus, an increase in measurement gap length also increases the chance of the FCCH falling in a measurement gap or an idle time slot. For example, the abort timer may be decreased when there is an increased number of measurement gaps, or the measurement gaps have an increased length.

The abort timer may also be adjusted based on the signal strength of a RAT (e.g., the second RAT). Signal strength could be the absolute signal strength of a single neighbor cell in the RAT or a relative signal strength between neighbor cells in the RAT.

The abort timer may also be adjusted based on the relative signal strength between cells in the RAT (e.g., the RSSI value or some other UE measured signal strength value of cells in the RAT) compared to a network indicated threshold value for triggering an IRAT measurement report or for performing IRAT measurement.

The abort timer may also be adjusted based on tone detection. In particular, the UE may be able to detect the FCCH burst when at least a certain percentage of the tone partially falls within a measurement gap. Thus, the abort timer can be adjusted based on what percentage of the FCCH burst falls within the measurement gap. The portion of the tone that falls within the measurement gap is a tone that may also be acquired during a system acquisition. Also, the percentage of the FCCH burst that falls within the measurement gap (or an idle time slot) for the UE to detect the FCCH burst may be determined by the capabilities of the UE. Such capabilities include power capabilities, speed capabilities, bandwidth capabilities and other capabilities.

In one configuration, depending on the increased probability of success of a certain outcome, the adjustable time of the abort timer may be shortened or lengthened.

The method provided by present disclosure for detecting FCCH bursts efficiently uses idle time slots of the first RAT, thereby speeding up the IRAT measurement procedures. The efficient use results in better IRAT handover performance as well.

In one configuration, the first RAT may be Time Division-Code Division Multiple Access (TD-SCDMA) and the second RAT may be Global System for Mobile Communications (GSM), Enhanced Data Rates for GSM Evolution (EDGE) or GSM EDGE Radio Access Network (GERAN).

Figure 6:
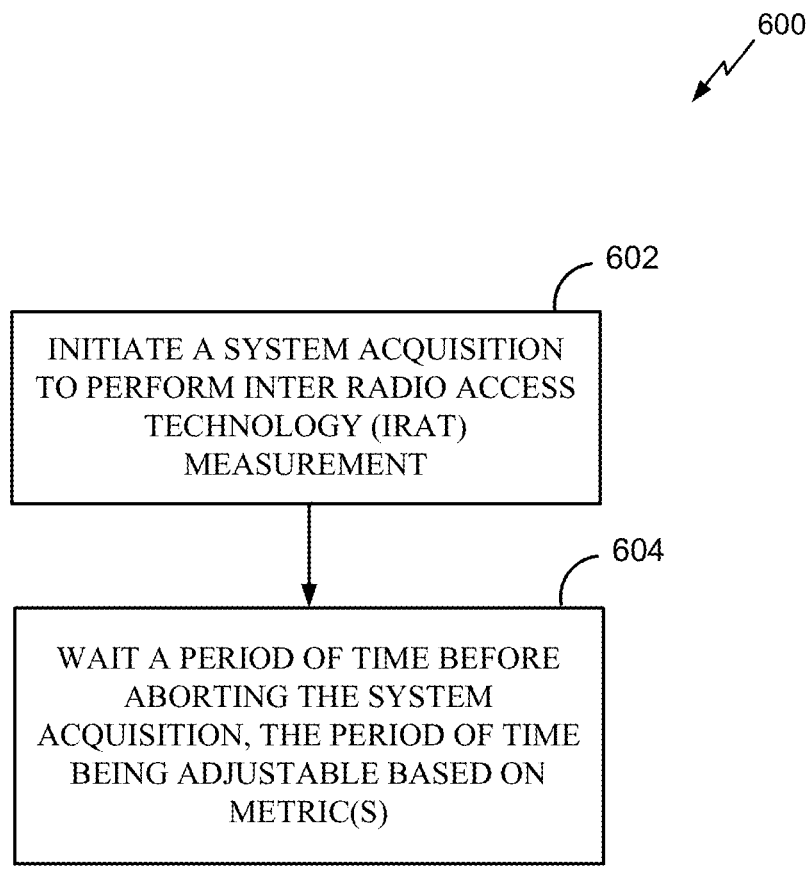
FIG. 6 is a block diagram illustrating a method for combining multiple received voice calls according to one aspect of the present disclosure.

FIG. 6 illustrates a wireless communication method 600 according to one aspect of the present disclosure. A UE initiates a system acquisition to perform inter radio access technology (IRAT) measurement, as shown in block 602. The UE waits a period of time before aborting the system acquisition. The period of time is adjustable based on at least one metric, as shown in block 604.

Figure 7:
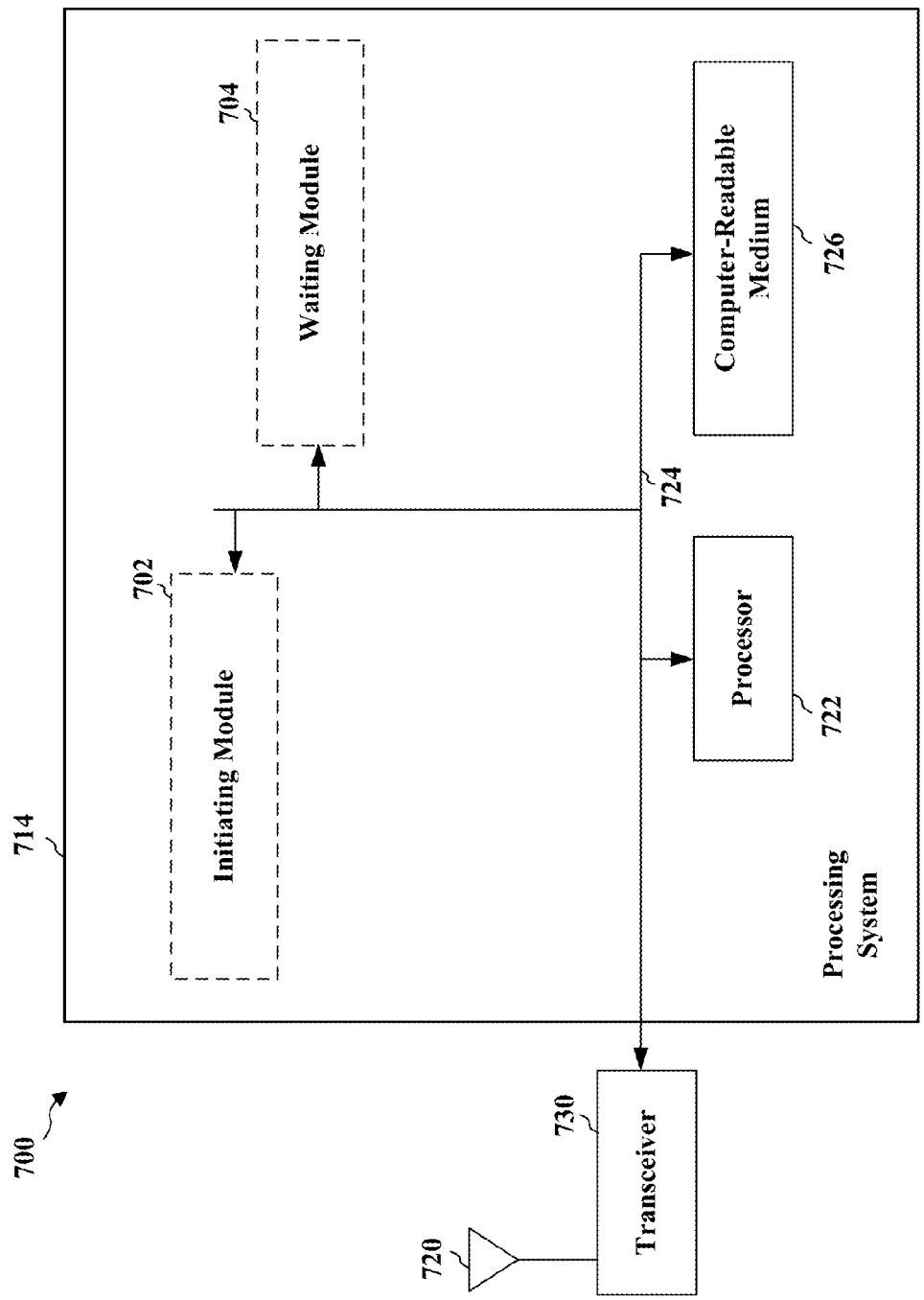
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722, an initiating module 702, a waiting module 704, and the computer-readable medium 727. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other devices over a transmission medium. The processing system 714 includes a processor 722 coupled to a computer-readable medium 727. The processor 722 is responsible for general processing, including the execution of software stored on the computer-readable medium 727. The software, when executed by the processor 722, causes the processing system 714 to perform the various functions described for any particular apparatus. The computer-readable medium 727 may also be used for storing data that is manipulated by the processor 722 when executing software.

The processing system 714 includes an initiating module 702 for initiating a system acquisition to perform inter radio access technology (IRAT) measurement. The processing system 714 also includes a waiting module 704 for waiting a period of time before aborting the system acquisition, the period of time being adjustable based at least in part on at least one metric. The modules may be software modules running in the processor 722, resident/stored in the computer-readable medium 727, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for initiating and means for waiting. In one aspect, the above means may be the antennas 352, the receiver 354, the channel processor 394, the receive frame processor 360, the receive processor 370, the transmitter 356, the transmit frame processor 382, the transmit processor 380, the controller/processor 390, the memory 392, the abort timer module 391, the initiating module 702, the waiting module 704, the processor 722, and/or the processing system 714 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    initiating, at a user equipment (UE), a system acquisition to perform inter radio access technology (IRAT) measurement; and
    waiting, at the UE, a period of time before aborting the system acquisition, the period of time being adjustable based at least in part on at least one metric comprising at least one of an absolute signal strength of a single neighbor cell or a relative signal strength between neighbor cells.

2. The method of claim 1, in which the at least one metric further comprises at least one of a frequency of available measurement gaps, a total number of available measurement gaps, or a length of each measurement gap within a subframe.

3. The method of claim 1, in which the at least one metric further comprises at least one of a user equipment (UE) measured signal strength compared to a network indicated threshold value for triggering an IRAT measurement report.

4. The method of claim 1, in which the at least one metric further comprises a percentage of a tone that falls within a measurement gap.

5. An apparatus for wireless communication, comprising:
    means for initiating, at a user equipment (UE), a system acquisition to perform inter radio access technology (IRAT) measurement; and
    means for waiting, at the UE, a period of time before aborting the system acquisition, the period of time being adjustable based at least in part on at least one metric comprising at least one of an absolute signal strength of a single neighbor cell or a relative signal strength between neighbor cells.

6. The apparatus of claim 5, in which the at least one metric further comprises at least one of a frequency of available measurement gaps, a total number of available measurement gaps, or a length of each measurement gap within a subframe.

7. The apparatus of claim 5, in which the at least one metric further comprises at least one of a user equipment (UE) measured signal strength compared to a network indicated threshold value for triggering an IRAT measurement report.

8. The apparatus of claim 5, in which the at least one metric further comprises a percentage of a tone that falls within a measurement gap.

9. A computer program product for wireless communication in a wireless network, comprising:
    a non-transitory computer-readable medium having non-transitory program code recorded thereon, the program code comprising:
        program code to initiate, at a user equipment (UE), a system acquisition to perform inter radio access technology (IRAT) measurement; and
        program code to wait, at the UE, a period of time before aborting the system acquisition, the period of time being adjustable based at least in part on at least one metric comprising at least one of an absolute signal strength of a single neighbor cell or a relative signal strength between neighbor cells.

10. The computer program product of claim 9, in which the at least one metric further comprises at least one of a frequency of available measurement gaps, a total number of available measurement gaps, or a length of each measurement gap within a subframe.

11. The computer program product of claim 9, in which the at least one metric further comprises at least one of a user equipment (UE) measured signal strength compared to a network indicated threshold value for triggering an IRAT measurement report.

12. The computer program product of claim 9, in which the at least one metric further comprises a percentage of a tone that falls within a measurement gap.

13. A user equipment (UE) for wireless communication, comprising:
    a memory; and
    at least one processor coupled to the memory, the at least one processor being configured:
        to initiate a system acquisition to perform inter radio access technology (IRAT) measurement; and
        to wait a period of time before aborting the system acquisition, the period of time being adjustable based at least in part on at least one metric comprising at least one of an absolute signal strength of a single neighbor cell or a relative signal strength between neighbor cells.

14. The user equipment of claim 13, in which the at least one metric further comprises at least one of a frequency of available measurement gaps, a total number of available measurement gaps, or a length of each measurement gap within a subframe.

15. The user equipment of claim 13, in which the at least one metric further comprises at least one of a user equipment (UE) measured signal strength compared to a network indicated threshold value for triggering an IRAT measurement report.

16. The user equipment of claim 13, in which the at least one metric further comprises a percentage of a tone that falls within a measurement gap.

* * * * *